Oct. 23, 1951 P. BROZIER 2,572,439
OSCILLATING SIGNAL LAMP
Filed Nov. 8, 1948 2 SHEETS—SHEET 1
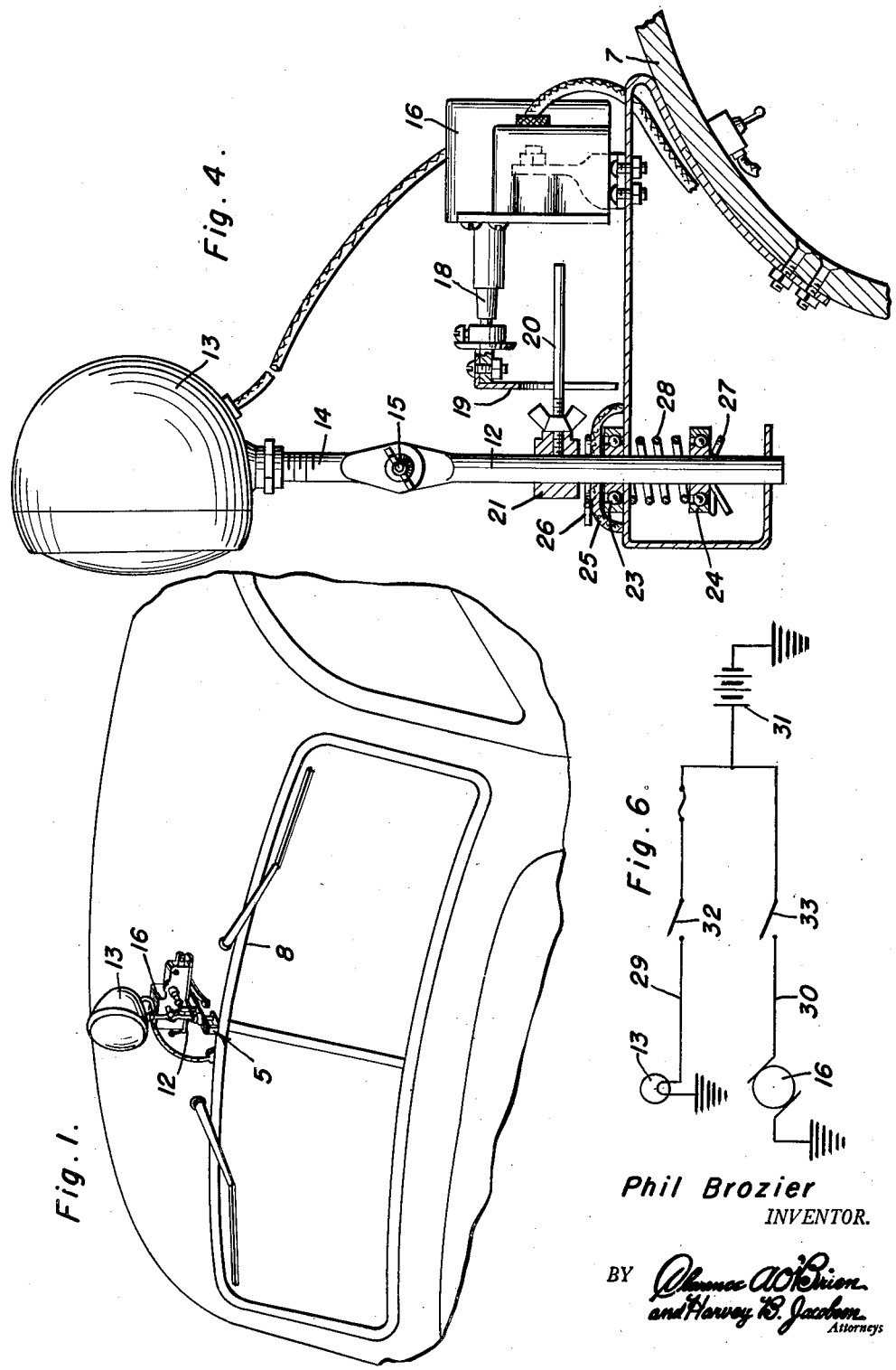
Phil Brozier
INVENTOR.

Oct. 23, 1951 P. BROZIER 2,572,439
OSCILLATING SIGNAL LAMP
Filed Nov. 8, 1948 2 SHEETS—SHEET 2
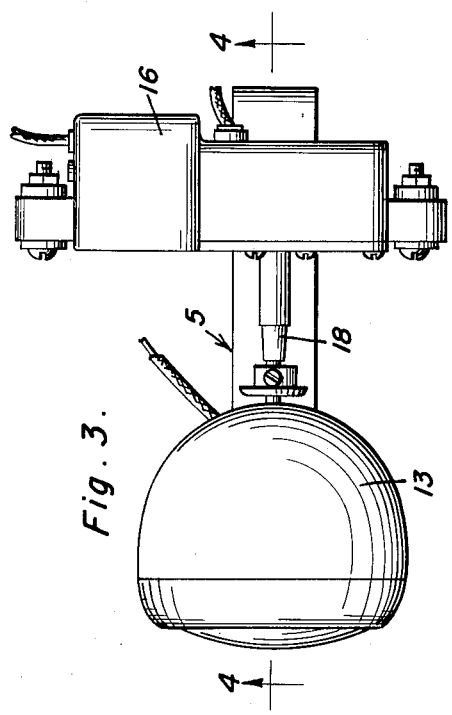
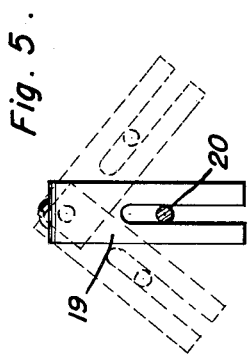
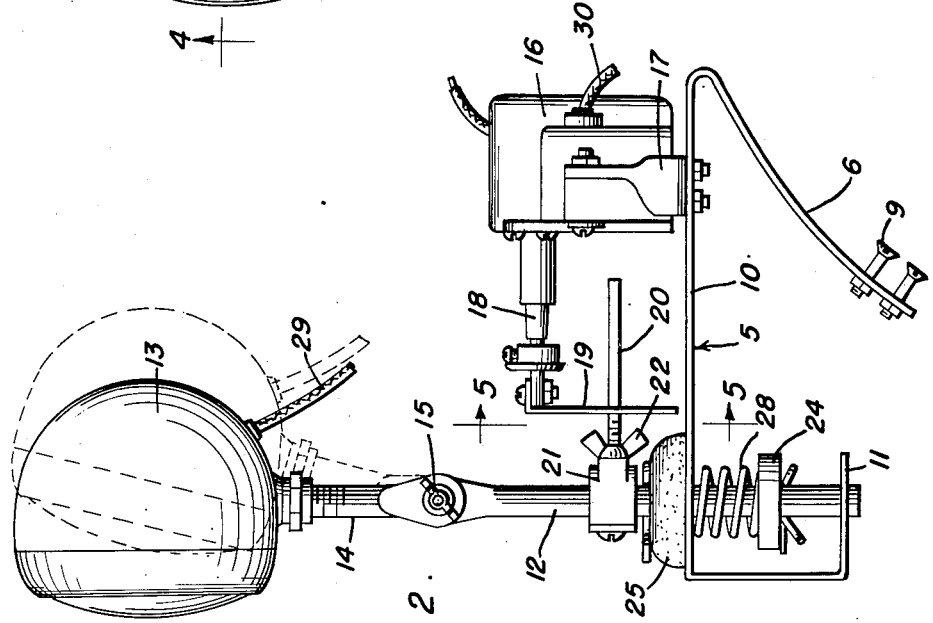
Phil Brozier
INVENTOR.

Patented Oct. 23, 1951

2,572,439

UNITED STATES PATENT OFFICE 2,572,439

OSCILLATING SIGNAL LAMP

Phil Brozier, Avella, Pa.

Application November 8, 1948, Serial No. 58,882

4 Claims. (Cl. 177—329)

The present invention relates to new and useful improvements in oscillating signal lamps for use with automobiles and other types of motor vehicles to function as a warning signal for the drivers of approaching vehicles.

An important object of the invention is to provide an oscillating warning signal light for motor vehicles particularly in cases where the irregular contour of the road ahead prevents a clear vision whereby to warn approaching vehicles of the presence of the vehicle carrying the warning signal, even though the latter may be out of sight.

A further object of the invention is to provide a motor operated oscillating lamp supported on an attaching bracket which may be secured to the top of an automobile or other motor vehicle and without necessitating any changes or alterations in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is an enlarged side elevational view.

Figure 3 is a top plan view.

Figure 4 is a longitudinal sectional view taken substantially on a line 4—4 of Figure 3.

Figure 5 is a vertical sectional view taken on a line 5—5 of Figure 2, and

Figure 6 is a diagram of the electric circuit for the lamp and operating motor therefor.

Referring now to the drawings in detail wherein for the purpose of illustration I have disclosed a preferred embodiment of the invention, the numeral 5 designates an attaching bracket which includes a curved attaching plate 6 shaped to conform to the contour of the top 7 of an automobile, at a point immediately above the windshield 8 for attaching thereto by means of bolts or the like 9. An arm 10 extends horizontally forwardly from the attaching plate 6 which is bent downwardly and rearwardly at its front end to form a support 11 which underlies the arm 10 at its front portion.

A vertical shaft 12 has its lower end journaled in the front portion of arm 10 and support 11 and supports a lamp housing 13 at its upper end for forward and rearward tilting adjustment by means of a standard 14 extending downwardly from the lamp housing and connected to the upper end of the shaft 12 by means of a bolt and wing nut 15.

An electric motor housing 16 is supported on the rear portion of arm 10 by means of a bracket 17, the motor being of a conventional design for operating an oscillating shaft 18 projecting forwardly therefrom.

A fork or yoke 19 is secured at its upper end to the shaft 18 and extends downwardly therefrom for engaging an arm 20 having its front end threaded in a collar 21 and secured thereto by a wing nut 22. The collar 21 is suitably secured to shaft 12.

The shaft 12 is journaled in upper and lower ball bearing assemblies 23 and 24, the upper bearing resting on the top of arm 10 and a weather-proof cover 25 is held over the upper bearing by a transverse pin 26 extending through the shaft.

The lower bearing 24 is supported on a transverse pin 27 extending through shaft 12 under arm 10 and a coil spring 28 is positioned between bearing 24 and arm 10 to hold the shaft downwardly on bracket 5.

The lamp 13 and motor 16 are connected by wires 29 and 30 with the battery 31 of the vehicle and separate switches 32 and 33 are provided for the lamp and motor to selectively energize the same.

In the operation of the device, the lamp 13 may be properly adjusted and the switch 32 therefor closed while the motor 16 remains idle to use the lamp as a stationary headlight or spot light and the switches 32 and 33 for both the lamp and motor may be closed to oscillate the lamp on a vertical axis to swing the beam of light in a horizontal path as a warning light for drivers of approaching vehicles.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A vehicle warning signal comprising a vertical shaft, a lamp housing, means detachably and swingably connecting the lamp housing to the upper end of the shaft for vertical swinging adjustment of the former, an arm projecting horizontally from the shaft, and a motor including a shaft connected to the free end of the arm for actuating the arm and shaft in an oscillating movement to swing the lamp housing horizontally.

2. A vehicle warning signal comprising a vertical shaft, a lamp housing supported at the upper end of the shaft, an arm projecting horizontally from the shaft, means for oscillating the arm and shaft and comprising a motor having a shaft, a vertically swingable fork attached to the shaft of the motor for actuation thereby, said fork engaging the free end of the arm to oscillate the lamp housing horizontally, and means securing the arm to the shaft for adjustment vertically in the fork to regulate the degree of oscillation of the lamp housing.

3. In an oscillating signal lamp, the combination of a vertical rockable shaft supporting the lamp, a horizontal arm projecting from the shaft, a motor including a shaft, a vertically swingable arm connected to the motor shaft and engaging the free end of the horizontal arm for horizontally swinging the latter to oscillate the lamp horizontally, and means connecting the horizontal arm to the first named shaft for vertical adjustment of the former relative to the second named arm to regulate the oscillating movement of the lamp.

4. A vehicle warning signal comprising an attaching bracket including a horizontal arm having a free end, a horizontal support united with the free end of the arm and positioned parallel thereto, means adapted for attaching the other end of the arm to a part of a vehicle, a vertical shaft having its lower end journaled in said free end of the arm and also journaled in said support, a lamp housing at the upper end of the shaft, a motor mounted on the arm, an oscillating arm projecting horizontally from the shaft, a vertically swingable member connected to the motor and engaging the free end of said last-named arm to oscillate the shaft and lamp housing, and means securing the last-named arm to the shaft for vertical adjustment of the former relative to the vertically swingable member to regulate the oscillating movement of the lamp housing.

PHIL BROZIER.

REFERENCES CITED

The following references are of record in the file of this patent:

UNITED STATES PATENTS

| Number | Name | Date |
|---|---|---|
| 1,197,862 | Scott | Sept. 12, 1916 |
| 2,308,085 | Kinney | Jan. 12, 1943 |
| 2,409,046 | Kennelly | Oct. 8, 1946 |
| 2,460,585 | Kennelly | Feb. 1, 1949 |